R. S. TWISS.

MAIL POUCH.

APPLICATION FILED JUNE 2, 1914.

Reissued Sept. 15, 1914. 13,801.

Inventor

Richard S. Twiss.

Witnesses

A. C. Newkirk

L. L. Morrill

By Mason Fenwick & Lawrence,

Attorneys

THE NORRIS PETERS CO., PHOTO-LITHO., WASHINGTON, D. C.

UNITED STATES PATENT OFFICE.

RICHARD S. TWISS, OF EDGERTON, VIRGINIA.

MAIL-POUCH.

13,801. Specification of Reissued Letters Patent. Reissued Sept. 15, 1914.

Original No. 1,092,962, dated April 14, 1914, Serial No. 805,255. Application for reissue filed June 2, 1914. Serial No. 842,522.

*To all whom it may concern:*

Be it known that I, RICHARD S. TWISS, a citizen of the United States, residing at Edgerton, in the county of Brunswick and State of Virginia, have invented new and useful Improvements in Mail-Pouches, of which the following is a specification.

This invention relates to mail pouches, and it consists in the novel features hereinafter described and claimed.

In the past much loss and inconvenience has been occasioned by reason of the fact that locks have become detached from mail pouches while the pouches are in transit. This frequently results in the loss of the lock and at times the contents of the pouch spill from the same and pieces of mail have been lost.

The prime object of the present invention is to prevent such loss not only of the locks, but also of the mail matter.

With the above objects in view, the pouch may be of any conventional form and is provided with a strap for securing the mouth thereof after the same has been choked. Upon this pouch is placed a handle which preferably consists of a section of chain covered with leather and to one end of the chain is attached the lock and the bail of the lock is adapted to be passed through the staple and is inserted in the body of the lock and caught by the tumblers. The said handle is secured at both ends to the pouch and when an operator picks up the pouch by the handle, should both ends of the handle remain secured to the pouch, he knows without investigating the lock that the free end of the bail is securely held in the body of the lock and consequently the pouch cannot come open in transit. If, however, when the operator picks up the pouch by the handle and should one end of the handle swing away from the pouch, he immediately knows that the bail of the lock has not been properly secured in the body thereof, and consequently the parts may be properly arranged before the pouch is thrown into the mail car or other vehicle for transit.

Figure 1:
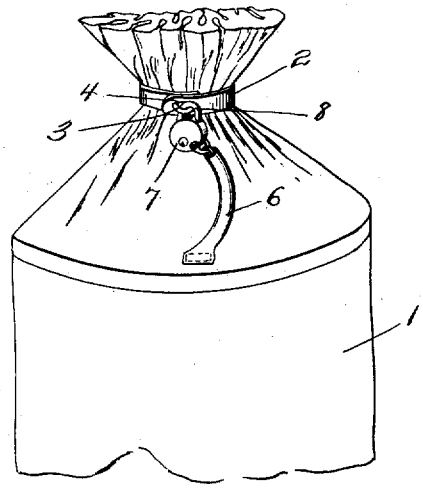
Figure 2:
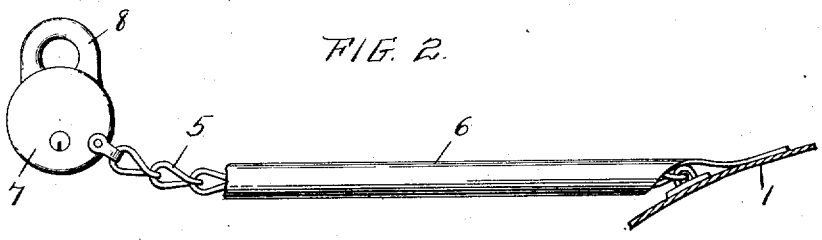

In the accompanying drawing: Figure 1 is a perspective view of the pouch. Fig. 2 is a detailed view with parts in section of the handle and lock.

As illustrated in the accompanying drawing, the pouch 1 is of conventional form and is provided with a strap 2 at its mouth which is adapted to surround the mouth of the pouch after the same has been choked or brought together so that the contents of the pouch may be retained therein. This strap 2 is provided with the usual staple 3 and hasp 4. The hasp 4 is passed over the staple 3 after the mouth of the pouch has been choked.

A handle comprising a chain section 5 is secured at one end to the body of the pouch 1 and this chain section is covered with a flexible material 6 preferably leather. To the free end portion of the chain section 5 is secured a lock 7 of conventional form. The said lock is provided with a bail 8 which is adapted to be passed through the staple 3 and when the said bail is passed through the staple and properly engaged with the tumblers or catches in the body of the lock 7, the parts are secured so that the handle of which the chain 5 is a part may be readily used for lifting or carrying the pouch.

When the bail 8 is disconnected from the staple 3, the lock 7 remains permanently connected with the pouch and consequently each pouch is accompanied by its own individual lock. By this arrangement of parts it will be seen that when the pouch is closed and the bail of the lock is properly engaged with the body thereof and the staple, a person who handles the pouch by the handle knows when the free end of the bail is properly secured in the body of the lock. If the bail has not been properly secured or caught by the catches or tumblers in the lock the said bail will swing open when an attempt is made to lift the pouch by the handle and consequently one end portion of the handle will swing away from the pouch which immediately indicates to the operator that something is wrong and proper adjustment can be made before the pouch is permitted to go in transit.

I claim:

1. The combination with a pouch and an encircling band having interengaging extremities, of a handle member comprising a flexible portion permanently secured at one end to the pouch; and a lock portion carried at the end opposite the secured end and adapted to secure the interengaging extremities.

2. The combination with a pouch having a flexible part encircled by a band having interengaging extremities, of a handle member permanently secured to the pouch at a distance spaced from the interengaging parts and embodying a lock adapted to coact with the interengaging parts.

3. The combination with a pouch and an encircling band completely embracing the bag and having overlapping interengaging extremities; of a handle permanently secured at one end to the bag and having in its length a lock adapted to interengage with the interengaging extremities.

4. The combination with a pouch comprising a body portion and a flexible neck portion adapted to be gathered together for closing, of a member adapted to hold such neck portion in closed position; and a handle having one end secured to the pouch and carrying at the opposite end means for interengaging with the closure holding member.

5. The combination with a pouch and a band adapted to encircle the pouch and constrict the opening, of a handle secured to the pouch; and a lock carried by the handle adapted to secure together the ends of the band and secure the pouch in constricted condition.

6. The combination with a pouch and a band of less length than the circumference of the pouch and having interengaging extremities, of a handle secured to the pouch and embodying a lock adapted to engage the interengaging extremities of the band.

7. A pouch having a strap for holding the mouth thereof in closed position, said strap having hasp and staple engaging means, a handle comprising a chain section secured to the pouch, a flexible cover over said section, a lock connected with the free end of the chain section and having a pivoted bail adapted to pass through said staple.

In testimony whereof I affix my signature in presence of two witnesses.

RICHARD S. TWISS.

Witnesses:
CHAS. E. MAY,
F. M. RIEGEL.

Copies of this patent may be obtained for five cents each, by addressing the "Commissioner of Patents, Washington, D. C."